(12) United States Patent
Coehoorn et al.

(10) Patent No.: US 6,853,513 B2
(45) Date of Patent: Feb. 8, 2005

(54) MAGNETIC SCANNING SYSTEM

(75) Inventors: Reinder Coehoorn, Eindhoven (NL); Stephen Rodney Cumpson, Eindhoven (NL); Godert Willem Renswoud Leibbrandt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 354 days.

(21) Appl. No.: 09/906,353

(22) Filed: Jul. 16, 2001

(65) Prior Publication Data

US 2002/0012190 A1 Jan. 31, 2002

(30) Foreign Application Priority Data

Jul. 28, 2000 (EP) .............................................. 00202705

(51) Int. Cl.[7] .......................... G11B 5/596; G11B 11/00
(52) U.S. Cl. ................................ 360/77.03; 369/13.11; 369/13.55; 360/59; 360/77.07
(58) Field of Search ............................. 360/59, 77.03, 360/77.07, 78.11, 135; 369/13.11, 13.12, 13.55

(56) References Cited

U.S. PATENT DOCUMENTS

| | | | | |
|---|---|---|---|---|
| 4,816,939 A | * | 3/1989 | Ford et al. ............... | 360/77.03 |
| 5,065,387 A | * | 11/1991 | Roth et al. ............... | 369/44.41 |
| 5,535,190 A | | 7/1996 | Moore et al. ............ | 369/295.2 |
| 5,682,360 A | * | 10/1997 | Oshima ....................... | 369/13 |

FOREIGN PATENT DOCUMENTS

| | | | | |
|---|---|---|---|---|
| DE | 3714804 A1 | | 11/1988 | ........... G11B/7/007 |
| JP | 2105319 | | 4/1990 | ........... G11B/5/596 |
| JP | 10340493 A | * | 12/1998 | |

* cited by examiner

Primary Examiner—Andrew L. Sniezek
(74) Attorney, Agent, or Firm—Michael E. Belk (57) ABSTRACT

A scanning device for scanning data-carrying disks. The disks include a magnetisable layer to and from which data is written and read using a magnetic transducer, such as a Giant Magneto-Resistive (GMR) transducer. Positioning of the transducer over a data track is achieved by optical tracking using a land/groove structure, and positioning of the transducer with respect to the optical tracking system by means of a reference beam transmitted through the disk.

17 Claims, 5 Drawing Sheets

MAGNETIC SCANNING SYSTEM

FIELD OF THE INVENTION

The present invention relates to a scanning device for scanning a magnetic record carrier, and to a record carrier with magnetically-recorded information thereon. More particularly, although not exclusively, the invention relates to a scanning device for scanning a rewritable magnetic record carrier, and to such a record carrier with magnetically-recorded information thereon. Scanning may refer to reading, writing or erasing data from the carrier.

BACKGROUND TO THE INVENTION

Advances in data storage capability have been manifested as faster data scanning times as well as the density of information which can be stored on the data record carrier. The desire for higher areal data densities has led to the development of a number of innovative data storage techniques.

Optical scanning devices are well known in the art, and include rewritable record carrier systems, like the CD-RW system. In these systems, data is written to and read from an optically varying medium by optical modulation. Increasing the data density by decreasing the dimensions of the data bits (usually pits in the optical surface of the record carrier) requires accurate imaging of the bits. A reduction in the bit size requires short wavelength or near-field operation and it is considered that present technologies are approaching their limit in terms of the signal to noise (SNR) requirements while still maintaining a useful system bandwidth.

Magnetic scanning devices, such as those used in hard disk drives, in which data is written to and read from a magnetisable medium by magnetic modulation, can exhibit high areal data densities by employing relatively short bit lengths. However, those systems use larger track widths than optical scanning devices, which imposes a significant limitation on the data density which may be recorded on a media. In this context, higher areal densities may also be possible by reducing the bit lengths even further. However, the same SNR will be required for the same bit error rate. In magnetic media, smaller bits require the use of even smaller particles with about 100 particles per bit being required for a reasonable SNR.

Smaller bit sizes become thermally unstable when used with media coercivities which are still writeable at approximately room temperature. This limitation can be overcome by using thermally assisted writing processes with high coercivity media. According to this technique, media with a coercivity which is too high to be written with current writing head technology at room temperature, is heated thereby lowering the coercivity. The media may then be written using magnetic modulation provided by current technology recording heads.

Magneto-optical scanning devices are also known. In those systems, data is written to a magnetisable medium by optical and magnetic means. Optical and/or magnetic modulation may be employed. However, in all such systems, the area data densities are defined by the optical part of the system, since the bit sizes are defined by the optical spot size. Reading from the medium is conducted optically.

Other hybrid systems, which combine aspects of both magnetic and optical technologies to push data storage densities to higher levels, have been proposed in: "H. Saga, H. Nemoto, H. Sukeda and M. Takahasji, 'New recording method combining thermo-magnetic writing and flux detection', Japanese Journal of Applied Physics, Pt 1, Vol 38, No 3B, March 1999, pp 1839–40"; and H. Katayama, S. Sawamura, Y. Ogimoto, J. Nakajima, K. Kojima and K. Ohta, 'New magnetic recording method using laser assisted read/write technologies', J. Magn. Soc. Japan, Vol. 23, Supplement No. S1, 1999, pp. 233–236.

JP-A-4-311848 describes optical track following in conjunction with magnetic reading and writing. The magnetic scanning head is located on the opposite side of the record carrier to the optical tracking head. The position of the scanning head is determined by means of magnetic field detection coils associated with the optical tracking head. These coils detect the modulated magnetic writing field thus allowing the position of the scanning head to be determined. However, the positioning accuracy is not as accurate as that exhibited by optical tracking systems.

JP-A-2-105319 describes a 'side-by-side' system whereby tracks defined by wobble bits formed on the on the record carrier, which are tracked using a laser, are placed next to magnetic data tracks. The area taken up by the wobble bits reduces the media area available for magnetic reading and writing.

DISCLOSURE OF THE INVENTION

In one aspect, the present invention provides a scanning device for scanning data records on a magnetic data record carrier, the record carrier including at least one magnetisable medium, the device including:

an optical source adapted to emit at least one reference beam;

an optical tracking means adapted to use optically detectable features of the record carrier to provide a tracking signal, wherein the device uses the tracking signal to position the optical source in relation to the record carrier;

one or more magnetic transducers for magnetically scanning data on the magnetisable medium; and optical detection means adapted to detect the reference beam following transmission through the record carrier and thereby position the one or more magnetic transducers in relation to the optical source.

In accordance with a further aspect, the present invention provides a scanning device for scanning data records on a magnetic data record carrier, the record carrier including at least one magnetisable medium, the device including:

an optical tracking system for following optical tracks on a record carrier;

a magnetic scanning system for scanning magnetic media at data track pitches less than the optical track pitches; and a positioning system for determining the positioning of the data tracks with respect to the optical tracks, wherein the magnetic scanning system is adapted to scan data tracks with a pitch which is smaller than the pitch of the optical data tracks detected by the optical tracking system.

In accordance with a further aspect, the present invention provides a record carrier with magnetically-recorded information thereon comprising a disk having land and/or groove tracks formed therein, wherein a region of the magnetic media corresponding to an individual land and/or groove track has a plurality of magnetic data tracks formed thereon.

The present invention allows the data tracks to be more closely spaced than in the prior art and is therefore a means by which the data density can be increased in a magnetic scanning device.

The use of an optical tracking system allows for a continuous composite servo or sampled servo system, providing accurate track following and hence read/write location. The device preferably uses a continuous composite servo tracking system. Optical tracking may be achieved using known techniques including one-beam push-pull tracking with Foucault focusing, or three-beam tracking with astigmatic focusing.

The optical tracking means may include at least one light emitting source, the output of which is processed to provide output signals which are used for tracking and focusing by the optical tracking means as well as for positioning the scanning head by way of the scanning head detecting the reference beam, as well as serving as one or more beams for heating the data track portions which are to be scanned by the scanning head.

The light source preferably also serves to heat the portions of the magnetisable medium which is scanned by the magnetic head, thereby increasing its susceptibility to magnetic writing.

The light source preferably provides one or more beams which serve both to heat the media and allow optical detection by the optical detection means and hence the scanning head thereby positioning the portion of the magnetisable medium which is to be written proximate a magnetic transducer.

The data records may correspond to a plurality of data bits, encoded to represent the data, magnetically written to the magnetisable medium.

The magnetisable medium preferably has a coercivity which is adapted to be resistant to magnetic writing at room temperatures, but is able to be magnetically written to when heated.

Data records may be written onto a region of the servo track by sufficiently heating the specified region to allow writing to occur and magnetically writing a data bit or bits to the specified region on the servo track. When magnetic writing is occurring, areas corresponding to whole servo tracks may be heated sufficiently or alternatively areas corresponding to only a portion of the servo track may be heated sufficiently.

There are preferably a plurality of data tracks per land and/or groove track width. The data tracks are preferably written in areas corresponding to both the grooves and the lands. The surface over which the magnetic read/write head flies is however preferably essentially flat.

The magnetic read/write head may include a plurality of individual magnetic read/write heads adapted to read/write corresponding data tracks simultaneously. In a preferred embodiment, data may be interleaved between the data tracks.

In an alternative embodiment, the read/write head may incorporate a single write head which writes a single data track at a time, wherein the magnetic write head is positioned appropriately in relation to the servo track according to the aforementioned optical tracking techniques.

BRIEF DESCRIPTION OF THE DRAWINGS

Figure 1:
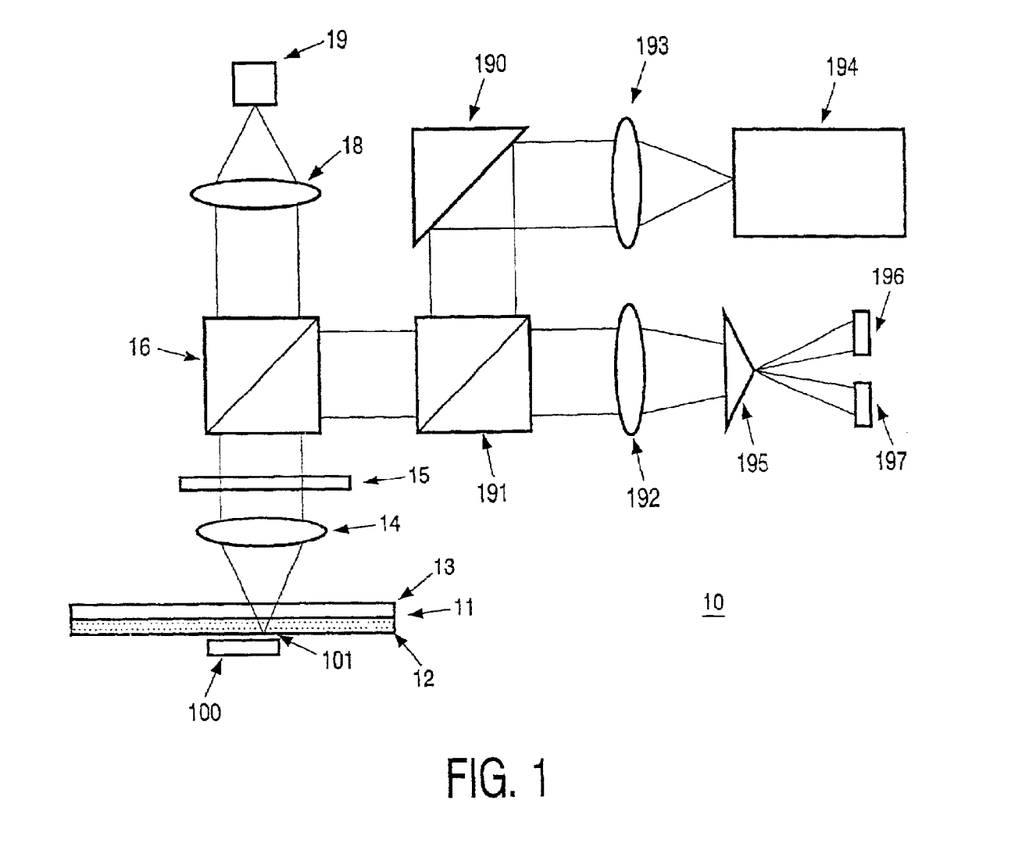
FIG. 1 illustrates a schematic representation of a device according to the present invention.

Features and advantages of various embodiments of the invention will become apparent from the following description, given by way of example only, of preferred embodiments of the invention, which refers to the accompanying drawings, wherein:

FIG. 1 illustrates a magnetic scanning device constructed in accordance with an embodiment of the invention.

A data record carrier 11 is shown in the form of a movable data record carrier (for example, a disk) viewed in cross section in a direction tangential to the track direction. The data record carrier is rotatably mounted and includes an optically detectable physical structural feature which allows an optical tracking/positioning system to accurately track and locate the optical tracking assembly at a specific position on the media. The scanning head scanning head 100 optically detects the transmitted beam. This allows the scanning head to be precisely located under the beam spot or spots. This will be described in more detail below. The optically detectable feature used in the present embodiment is a series of concentric grooves, or a concentric spiral groove, which is detected by the track following optics.

Figure 2:
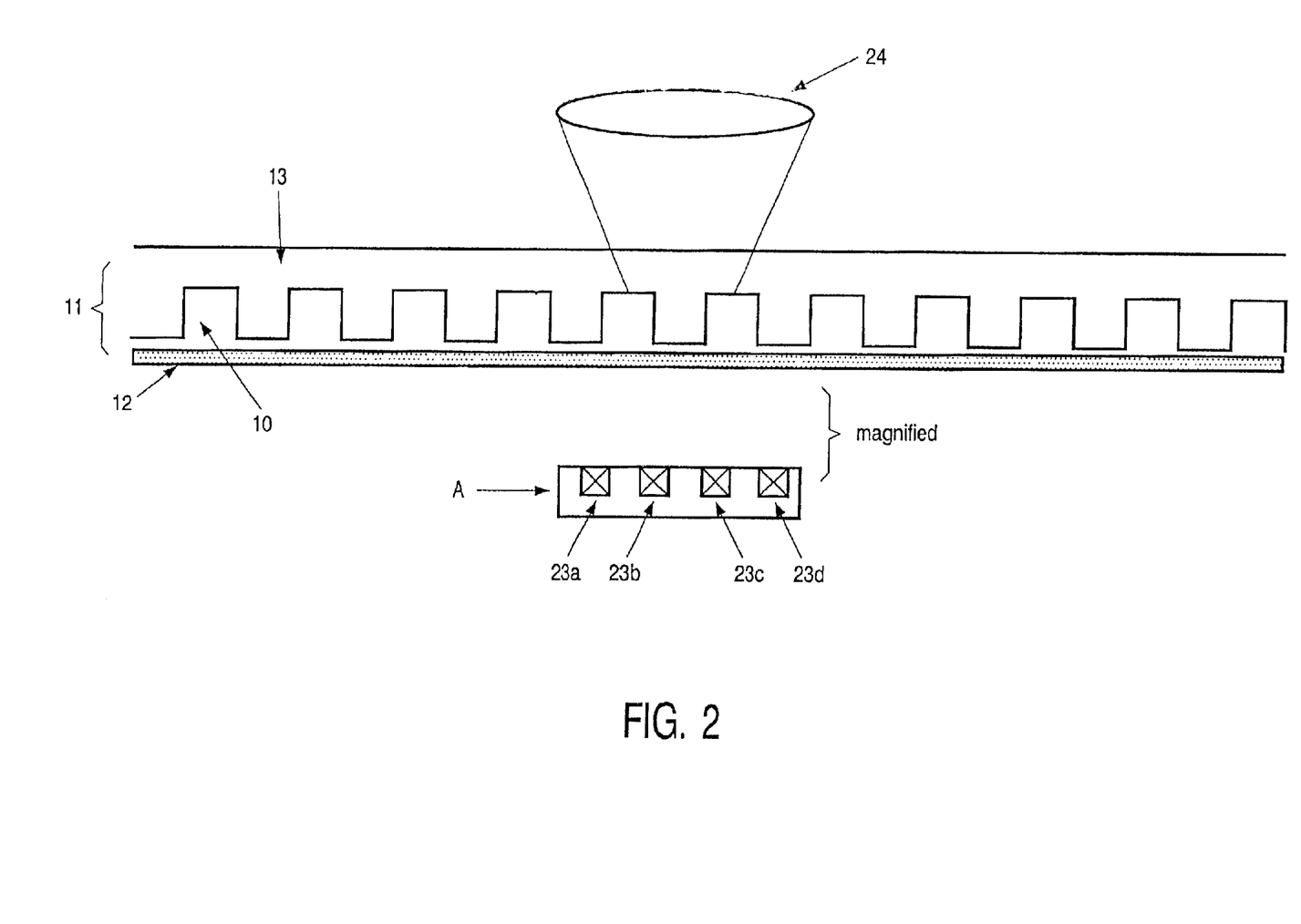
FIG. 2 illustrates a simplified cross-sectional view through a data record carrier along the tangential direction, showing the position of the magnetic scanning head layout.
Figure 4:
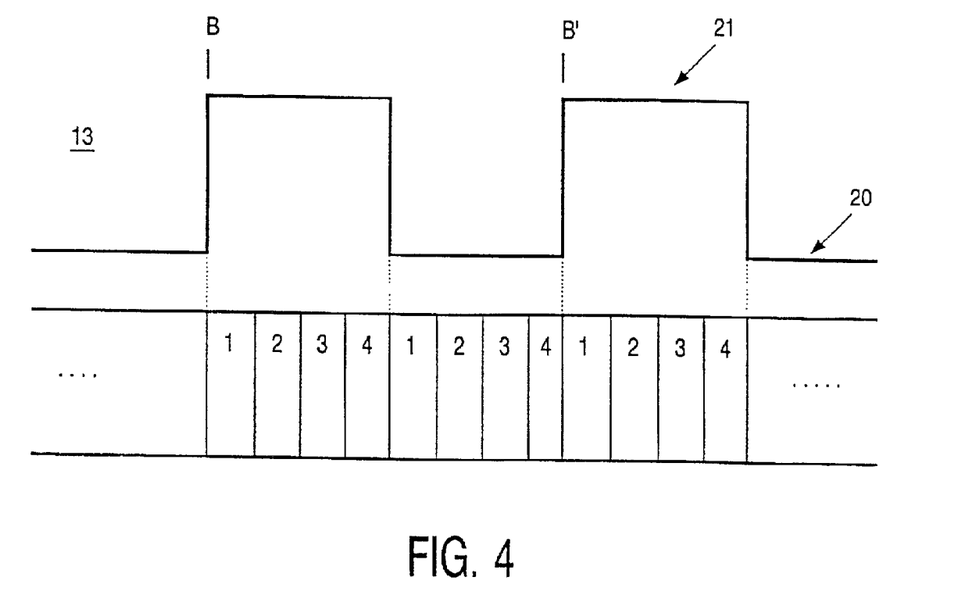
FIG. 4 illustrates a detailed tangential simplified section through a data record carrier, showing an embodiment of a data track layout on the writeable media in relation to the groove/land record carrier topography.

The data record carrier may be constructed according to a variety of techniques similar to those commonly used for conventional magneto-optical data storage systems. Of course other suitable types of magnetisable media, such as those used in the record carriers of hard disk drives, may be used. The simplified magnified structure of a preferred media construction is shown in FIGS. 2 and 4 and will be described in more detail below.

The data record carrier includes a transparent substrate 13, made for example of glass, on which the physical land and groove tracks were originally formed. The groove structure is of dimensions in the order of, or less than, 1 $\mu$m. The groove structure of the disk provides track following and focus information. It could also contain logical information or positional information for system housekeeping functionality.

A fill layer 10 is layered over the land/groove surface. In embodiments in which the tracking system uses a reflected beam spot image, the surface is lit from the side of the substrate 13 and the fill layer is preferably a substantially reflective material. Otherwise, it is preferably substantially transmissive, although a thin reflective layer may be added close to the surface land/groove to provide reflection from either side of the disk at the land/groove surface.

To allow the magnetic read/write head to fly very low over the data record carrier (to be in near contact with, preferably less than 50 nm away from, the disk), the fill layer is treated or machined flat. A buffer layer (not shown) of approximately 30 nm thickness is sputtered onto the flattened fill layer 10 covering the groove structure. A magnetisable medium 12, in particular a magnetisable metallic layer of approximately 20 nm thickness, is then sputtered onto the buffer layer. Finally, a protective layer (also not shown) of approximately 5 nm is added.

The general layout, construction and operation of the tracking/focusing component of the device is similar to known optical scanning/track following systems. The optical tracking/focusing system functions as follows. Referring to FIG. 1, a light source 19 (for example, a semiconductor laser) radiates a linearly polarised divergent beam of coherent laser light. The linearly polarised divergent beam passes though a collimator 18 which converts it into a beam of coherent, parallel light. The beam then enters a polarising beam splitter 16. The beam splitter 16 consists of two right-angled prisms separated by a one-way mirror membrane. All of the beam passing through the polarising beam splitter 16 emerges and enters a quarter-wave plate 15. The parallel beam is thereby converted into a circularly polarised beam whereupon it is focused on the read/write media 12 by the lens 14, as shown.

The at least partially reflected beam passes through the objective lens 14 and through the quarter-wavelength plate 15. The quarter-wavelength plate converts the beam to a linearly polarised beam which is 90 degrees out of phase with the source 19. All of the reflected light returning through the quarter-wavelength plate 15 is reflected by the polarising beam splitter 16 into a non-polarising beam splitter 191. A first beam is reflected through 90 degrees whereupon it is reflected again though 90 degrees by a prism/mirror 190 and is passed through an objective lens 193 which focuses the image of the beam spot 101 on the data carrying media into a tracking photodetector array 194. The tracking photodetector array 194 provides a tracking signal based on a knowledge of the correct relationship of the imaged beam or beam array in relation to the servo groove pattern. Beam tracking techniques will not be discussed in detail as there are a number of techniques which will be familiar to one skilled in the art.

The transmitted beam passing straight through the beam splitter 191 passes through an objective lens which focuses the beam at the focal point of the objective lens 192. The converging beam is intercepted by a wedge 195 which splits the image into two beams which are directed onto focus error detecting photo-detectors 196/197, whereby focusing errors caused by flexing of the disk or mechanical defects in the disk mounting/drive system can be corrected for by means of a servo control system.

Figure 9:
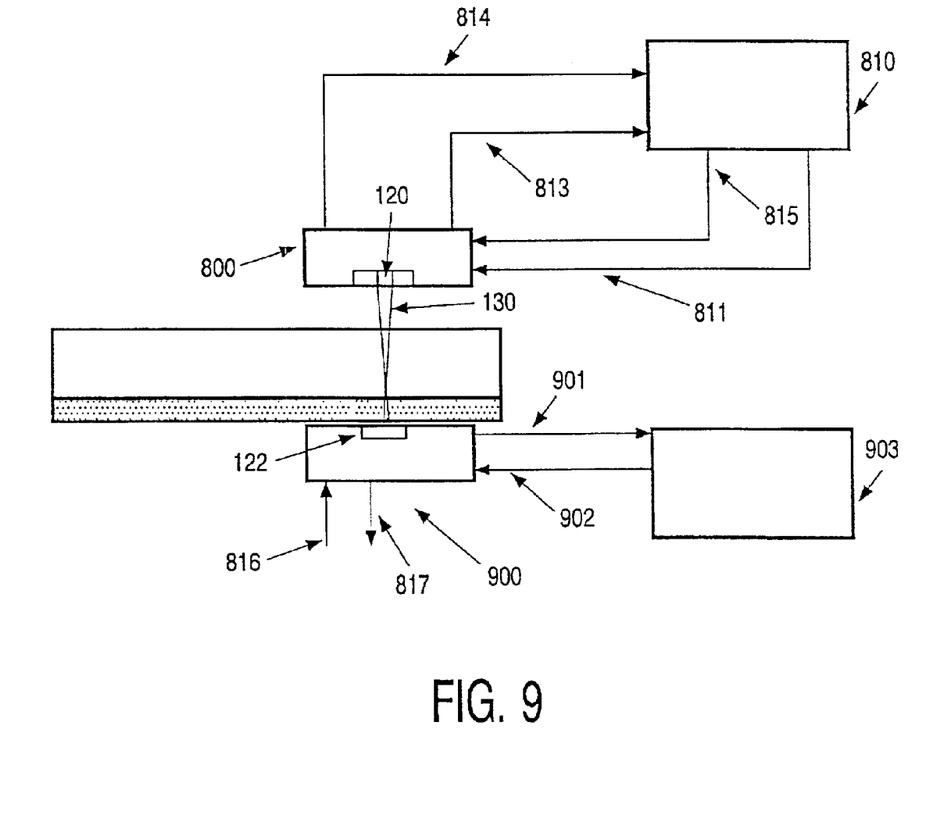
FIG. 9 illustrates a control system used in embodiments of the invention.

Referring to FIG. 9, a control system used in this embodiment of the device is shown. A rotary arm positions the optical head 800 which outputs a focus error signal 813 to a control circuit 810, which processes the signal and outputs a focus control signal 815 to the optical head, which alters its axial position according to the signal 815. The optical head also outputs a tracking error signal 814 to the control circuit 810, which processes the signal and outputs a tracking error signal 811 to the optical head rotary arm.

The beam tracking/focusing system allows the optical head 800 to be accurately positioned over a particular part of the record carrier topography. In a preferred form of the invention, a reference beam 130 is emitted from the optical head 120. The reference beam is at least partially transmitted entirely through the record carrier whereby the reference beam is imaged on the underside of the record carrier by a 4-quadrant detector 122. This detector outputs reference beam error signal 901 to positioning control system 903 which generates a reference beam error signal 902 which is used as a control signal for the scanning head position. This allows the magnetic scanning head to be locked to the precise position of the optical tracking head via the reference beam.

The magnetic scanning head 900 is in the form of a slider which is held in near contact with the disk and comprises one or more magnetic transducers and the optical detector 122. The optical detector 122 is constructed to allow positioning of the scanning head to at least the resolution of the optical tracking system. The scanning head 900 is preferably mounted in the scanning device by means of a rotary arm, whereby the head is accurately radially movable across the disk. Accordingly the head 900 is positionable on the surface of the disk by tracking the reference beam and hence to an accuracy of at least to within one data track during the scanning process. The scanning head 900 includes at least one magnetic read/write transducer, preferably in the form of a known Giant Magneto-Resistive (GMR) transducer.

As will be discussed in detail below, a plurality of data tracks are preferably located, when viewed in cross-section, adjacent each area of the disk corresponding to each land and groove. This is shown in detail in FIG. 4, whereby the magnetic medium is in the form of a substantially planar layer located below the groove/land topology.

The written data track width is defined by the magnetic field rather than by the dimensions of the heating beam spot. This is to be contrasted with conventional magneto-optical systems, in which the magnetic field covers a large area and the beam spot determines both the written area and the read area. The magnetisable media is preferably heated through the substrate, by means of the optical beam to allow thermally-assisted writing. During reading, the intensity, and hence the heating effect of the beam is preferably reduced whilst the optical tracking detection remains operable using the same beam. Alternatively a separate heating beam, which is switched on during writing, is switched off during reading.

FIG. 2 illustrates a simplified cross-section through a portion of the record carrier along with an enlarged 4-channel slider head 22. In this embodiment the optical tracking system illuminates the magnetisable layer from the opposite side to that on which the head 22 is located. The slider head 22 is moved in unison with the optical tracking by way of the transmitted reference beam which is imaged by the 4-quadrant detector 30.

Figure 3:
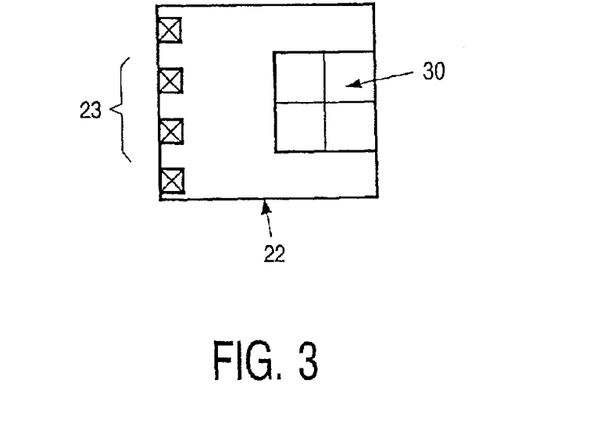
FIG. 3 illustrates a schematic side view of a scanning head arranged in accordance with one embodiment of the invention.

The 4-channel slider head 22 in FIG. 2 is shown magnified compared to the scale of the radial cross section through the record carrier 13. The head comprises four magnetic read/write GMR transducers 23a, 23b, 23c and 23d. These are spaced apart so that a complete set of four data tracks can fit in a radial width corresponding to the width of either land 20 and/or a groove 21. This is more clearly seen in FIG. 4. The view of the head shown in the upper part of FIG. 2 is from the front or viewed tangentially to the grooves. FIG. 3 shows the simplified layout of the head when viewed from the side facing the disk.

In FIG. 3, a 4-quadrant optical tracking detector 30 is shown located behind the read/write head array 23. This photodetector array detects the image of the transmitted reference beam. Referring to FIG. 9, the photodetector outputs signals 901 to controlling circuitry 903 which produces a reference beam tracking error signal 902. This is used to keep the magnetic scanning head 900 directly below the optical tracking head 800 and thus in a fixed relation to the optical tracking head.

Arranging the magnetisable layer to be at least partially optically transparent allows the 4-quadrant detector 30 to detect the transmitted reference beam.

Locking the magnetic scanning head to the reference beam, in conjunction with optically tracking the servo land/groove pattern, provides desired optically accurate positioning of the magnetic scanning head. This allows highly accurate positioning of the magnetic scanning head, for writing and reading of the data tracks, with a data track pitch which is smaller than the land/groove track pitch. Preferably, the land/groove track pitch is a multiple of the data track pitch; in the embodiment shown it is four times the data track pitch.

FIG. 4 illustrates the positioning of the magnetic data tracks (tracks 1 to 4) in relation to the land and groove servo tracks 20, 21. The data tracks are written on a planar magnetic media layer 12, with the groups of 4 tracks arranged to coincide with the lands and grooves 21 and 20 respectively. Tracking is performed over an area spanning a land and a groove, such as the area B-B', according to techniques discussed above. It is possible to have 1, 2, 3 or 4 channels selectively operating on the read/write head simultaneously, by selectively activating different ones of the GMR transducers. When more than one channel is written or read simultaneously, the data is preferably still from a single source (e.g. a file), and the data is interleaved and de-interleaved by the scanning device.

In this 4-channel embodiment, after positioning the magnetic scanning head, four data tracks 1,2,3,4 are written onto the media layer 12. Each data track can for example occupy only 0.2 $\mu$m, allowing very high areal densities to be achieved (around 40 Gb/in$^2$ for a 0.1 $\mu$m bit length). It should be noted that other numbers of magnetic transducers, ranging from one or more may be used in the slider head 22. The upper limiting factor to the number of such transducers used per land and/or groove track is the accuracy of the optical positioning technique, the resolution with which the magnetic data bits can be written to the media and the degree of accuracy with which the scanning head can tack the reference beam.

Figure 5:
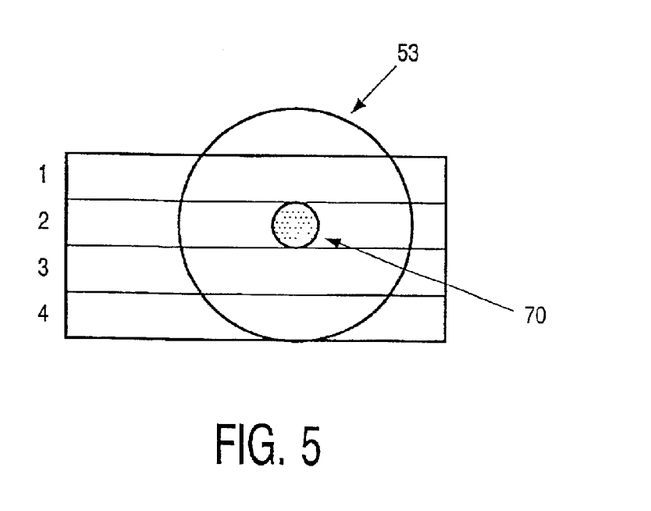
FIG. 5 illustrates one embodiment of intensity/temperature profile of a heating spot.

Referring to FIG. 5, to thermally assist writing the data, a heating spot 53 is directed at the magnetisable layer. The heating spot and tracking spots and/or reference beam are preferably derived from the same beam, and the reference beam may be used as the heating beam during writing, by increasing its intensity. The various beam spot configurations for tracking, track following, reference beam location and heating may be provided by interposing a suitable diffraction grating or hologram between the light source and the objective lens of the optical tracking system. The temperature profile of the spot 53 exhibits a temperature gradient with a high temperature region covering a data track which is to be written to. The high temperature region 70 may be arranged so as to cover substantially only the track which is to be written, and if more than one data track is to be written simultaneously, a number of individual heating spots may be used. Alternatively, the heating spot 53 can be arranged such that the high temperature region covers substantially only the entire 4-data-track width (see FIG. 6).

Figure 6:
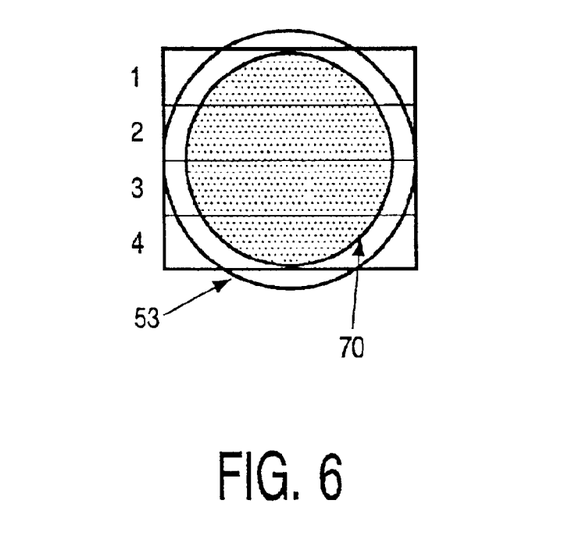
FIG. 6 illustrates an alternative embodiment of a heating spot profile.
Figure 7:
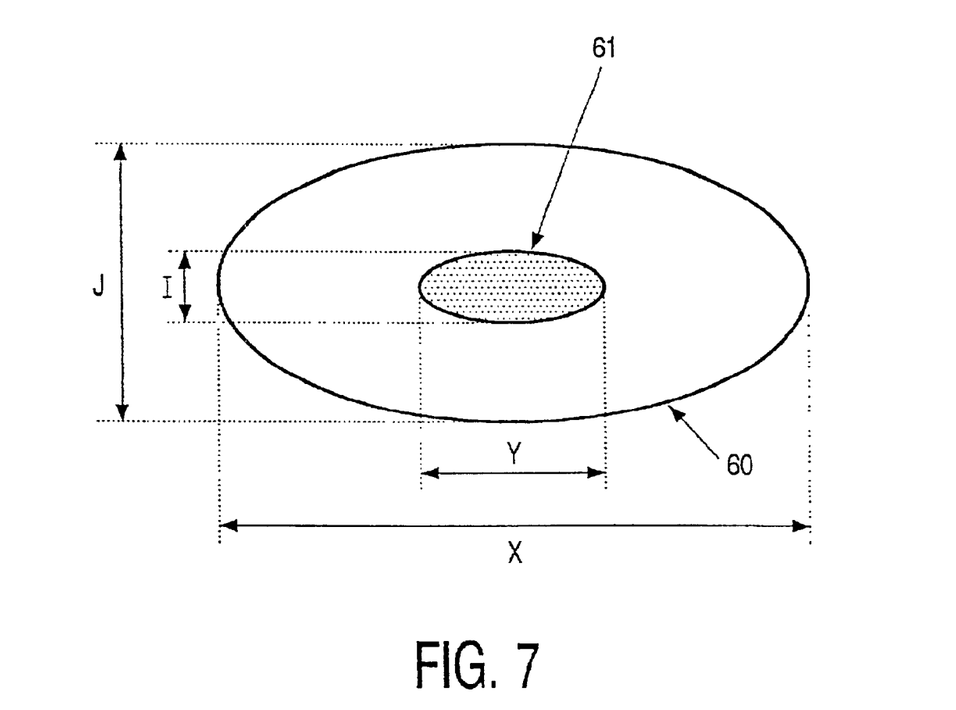
FIG. 7 illustrates a further alternative embodiment of a heating spot profile.

An alternative to the circular spots shown in FIGS. 5 and 6 is shown in FIG. 7, where the heating spot 60 is elliptical and oriented with its long axis parallel to the lineal track direction. This helps in the shaping of the temperature profile and assists in confining the dimensions of the high temperature region 61.

Figure 8:
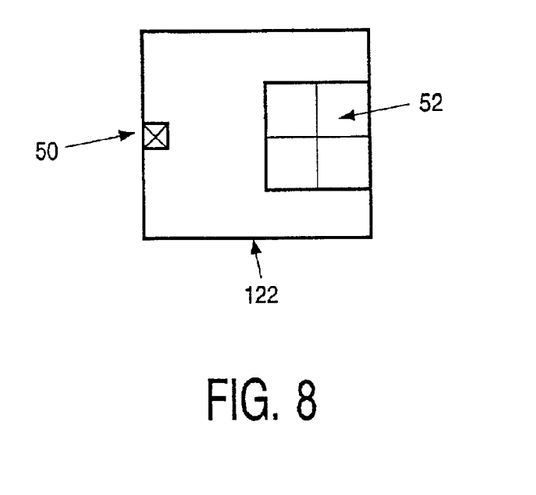
FIG. 8 illustrates a schematic plan view of a scanning head arranged in accordance with a further embodiment of the invention.

A further embodiment of the present invention is illustrated in FIG. 8. Only a single magnetic read/write GMR transducer 50 is located on the slider head 122 along with a 4-quadrant detector 52. In this case the head is used to read and/or write multiple data tracks serially in correspondence with tracking over a single land and/or groove and the slider head 122 is be moved in unison with the optical head between the data tracks. So long as the read/write head follows the reference beam, the position of the data track compared to the land or groove may be determined and used to provide tracking along any data track.

There are a number of further embodiments which are possible within the scope of the invention. For example, the preferred embodiment described above uses the magnetic head on one side, and the optical head of the other side, of the data record carrier. The optical head includes a focusing photodetector array and a tracking photodetector array to perform focusing and track following, respectively. The magnetisable layer is at least partially optically transmissive which allows the transmission and hence the detection of the reference beam. This allows the scanning head to remain 'locked' under the spot position. In an alternative embodiment, the optical tracking detection is also performed on the side of the magnetic head, by placing the tracking photodetector array on the magnetic head. The tracking signal is then generated by detecting the one or more tracking spots in transmission. The optically detectable features, such as land and groove track edges, may be made detectable by the tracking system by arranging that different refractive indices may be provided in the media to either side of the land and groove surface.

In the embodiments illustrated in FIGS. 3 and 8, the magnetic transducer(s) is/are located behind the optical detector 30/52. That is to say, when the scanning device is in operation and the disk is spinning and being scanned, the region of the disk being illuminated with the optical reference beam and/or the optical tracking beam(s) first passes the optical detector before passing the magnetic transducer (s). Thus, where it optical reference beam is being used as a heating beam during a magnetic write process, the centre of the reference beam will coincide with the optical detector. Thus, the centre of the area being heated will not correspond with the location of the magnetic transducers, which are located behind that centre. However, this is desirable, since the region of highest temperature will also be behind the centre of the heating beam, and the area will in any case remain above the Curie temperature, and thus remain writeable, for a latency period following the heating.

A significant advantage of the above-described embodiments is that, in contrast to conventional magnetically tracked disk-based data storage systems, the tracking signal of the present invention is constant and is physically and electronically independent of the data stream being read from, or written to, the magnetic media on the record carrier. This means that the magnetic data bits can be written to positions on the media with optical tracking precision, at relatively high data rates and subsequently at a significantly higher areal density than for, for example, conventional hard-disk drives. Further the use of a reference beam allows the scanning head to be autonomously located directly below the beam spot at optical accuracies. Thus a desired data track can be written by 'steering' the magnetic scanning head by moving the reference mean. Alternatively, the magnetic scanning control hardware may be used to displace the magnetic transducers relative to the fixed reference beam. This is based on a knowledge of the geometry of the scanning head and dimensions/location of the data tracks.

Referring to thermally assisting the magnetic scanning step, although the heating beam can be localised so that the portion of the disk which is being magnetically written is heated quite precisely, it is possible to heat a larger portion of the disk than that covering only the one or more data tracks to be written. As noted above, the data bits are written to the media in locations governed solely by the position of the magnetic read/write heads.

Optical tracking, combined with the very high lineal bit densities available when using magnetic reading and writing techniques, allows the present invention to achieve accurate track following, and therefore accurate placement and reading of the data bits within the magnetic data tracks. Further, thermally assisting the magnetic writing onto the media allows the use of high coercivity media which are stable at high bit densities and over long time scales, but which can still be written using known flux guide materials.

Typical applications for the invention may include storage of data analogous to hard disk drives on computers. A further application may include digitally encoding audio/video data for storage, distribution and playback on removable media.

Although the present invention has been described by way of example only and with reference to the possible embodiments thereof, it is to be appreciated that improvements and/or modifications may be made thereto without departing from the scope of the invention as set out in the appended claims.

Where in the foregoing description reference has been made to integers or components having known equivalents, then such equivalents are herein incorporated as if individually set forth.

What is claimed is:

1. A scanning device for scanning data records on a magnetic data record carrier, the record carrier including at least one magnetisable medium, the device including:
   an optical source adapted to emit at least one reference beam;
   an optical tracking means adapted to use optically detectable features of the record carrier to provide a tracking signal, wherein the device uses the tracking signal to position the optical source in relation to the record carrier;
   one or more magnetic transducers for magnetically scanning data on the magnetisable medium; and
   optical detection means adapted to detect the reference beam following transmission through the record carrier and thereby position the one or more magnetic transducers in relation to the optical source.

2. A scanning device for scanning data records on a magnetic data record carrier as claimed in claim 1, wherein the one or more magnetic transducers and the optical detection means are incorporated into a scanning head.

3. A scanning device for scanning data records on a magnetic data record carrier as claimed in claim 2, wherein the scanning head is located on the opposite side of the record carrier to the optical tracking means.

4. A scanning device for scanning data records on a magnetic data record carrier as claimed in claim 1, wherein, the one or more reference beams corresponds to or includes an optical pattern of a substantially known geometry which is imaged by the optical tracking means in order to position the optical source in relation to the record carrier.

5. A scanning device for scanning data records on a magnetic data record carrier as claimed in claim 1, wherein the features on the record carrier detectable by the optical tracking means comprise land tracks and/or groove tracks formed in the physical structure of the record carrier.

6. A scanning device for scanning data records on a magnetic data record carrier as claimed in claim 5, wherein the record carrier is in the form of a disk and the land and/or groove tracks are in the form of one or more substantially continuous spirals or rings concentric with the disk.

7. A scanning device for scanning data records on a magnetic data record carrier as claimed in claim 5, wherein magnetisable medium is formed in a substantially planar layer separated from the land and/or groove tracks.

8. A scanning device for scanning data records on a magnetic data record carrier as claimed in claim 1, wherein the optical tracking means detects light from the optical source which is either transmitted through the magnetic data record carrier or is reflected from the optically detectable features.

9. A scanning device for scanning data records on a magnetic data record carrier as claimed in claim 1, wherein the one or more magnetic transducers are adapted to write data to the magnetisable medium.

10. A scanning device for scanning data records on a magnetic data record carrier as claimed in claim 9, wherein the device is adapted to use a heating beam to heat portions of the magnetisable medium which are to be written.

11. A scanning device for scanning data records on a magnetic data record carrier as claimed in claim 10, wherein the heating beam is emitted by the same optical source emitting the reference beam.

12. A scanning device for scanning data records on a magnetic data record carrier as claimed in claim 11, wherein the heating beam is used as the reference beam.

13. A scanning device for scanning data records on a magnetic data record carrier as claimed in claim 1, comprising a scanning head incorporating a plurality of said magnetic transducers whereby a plurality of data tracks may be scanned simultaneously.

14. A scanning device for scanning data records on a magnetic data record carrier as claimed in claim 1, wherein optical tracking is achieved using one-beam push-pull tracking with Foucault focusing, or three-beam tracking with astigmatic focusing.

15. A scanning device for scanning data records on a magnetic data record carrier, the record carrier including at least one magnetisable medium, the device including:
   an optical tracking system for following optical tracks on a record carrier;
   a magnetic scanning system for scanning magnetic media at data track pitches less than the optical track pitches; and
   a positioning system for determining the positioning of the data tracks with respect to the optical tracks, wherein the positioning system includes a reference beam located in known relation to an optical track being followed and a reference beam detection means associated with the magnetic scanning system;
   wherein the magnetic scanning system is adapted to scan data tracks with a pitch which is smaller than the pitch of the optical data tracks detected by the optical tracking system.

16. A scanning device as claimed in claim 15, wherein the magnetic scanning system includes a plurality of magnetic transducers capable of simultaneously scanning different data tracks.

17. A scanning device as claimed in claim 15, wherein the magnetic scanning system includes a magnetic transducer and said device is capable of selectively positioning said transducer in different data tracks whilst following the same optical track using said tracking system.

* * * * *